Figure 1:
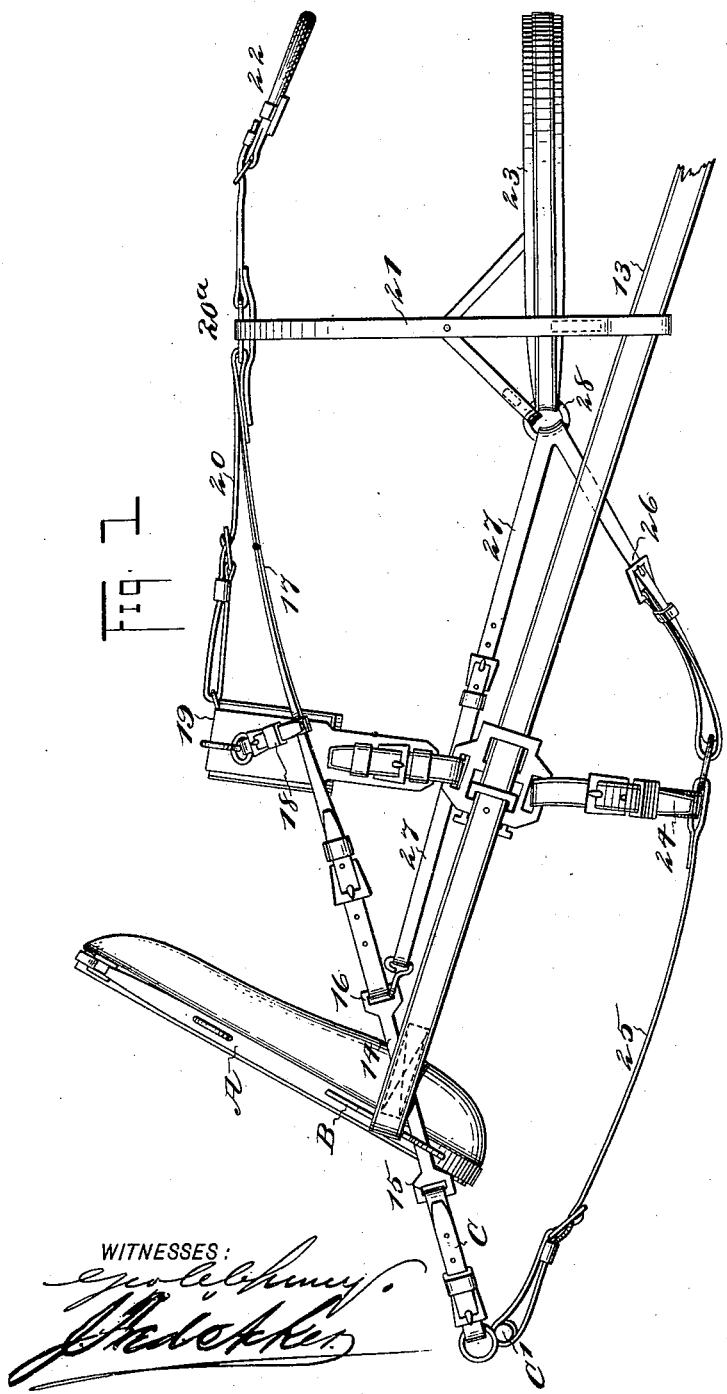

No. 645,327. Patented Mar. 13, 1900.
C. B. OLSEN.
HARNESS.
(Application filed Sept. 16, 1899.)
(No Model.) 2 Sheets—Sheet 1.

WITNESSES:

INVENTOR
Carl B. Olsen
BY
ATTORNEYS

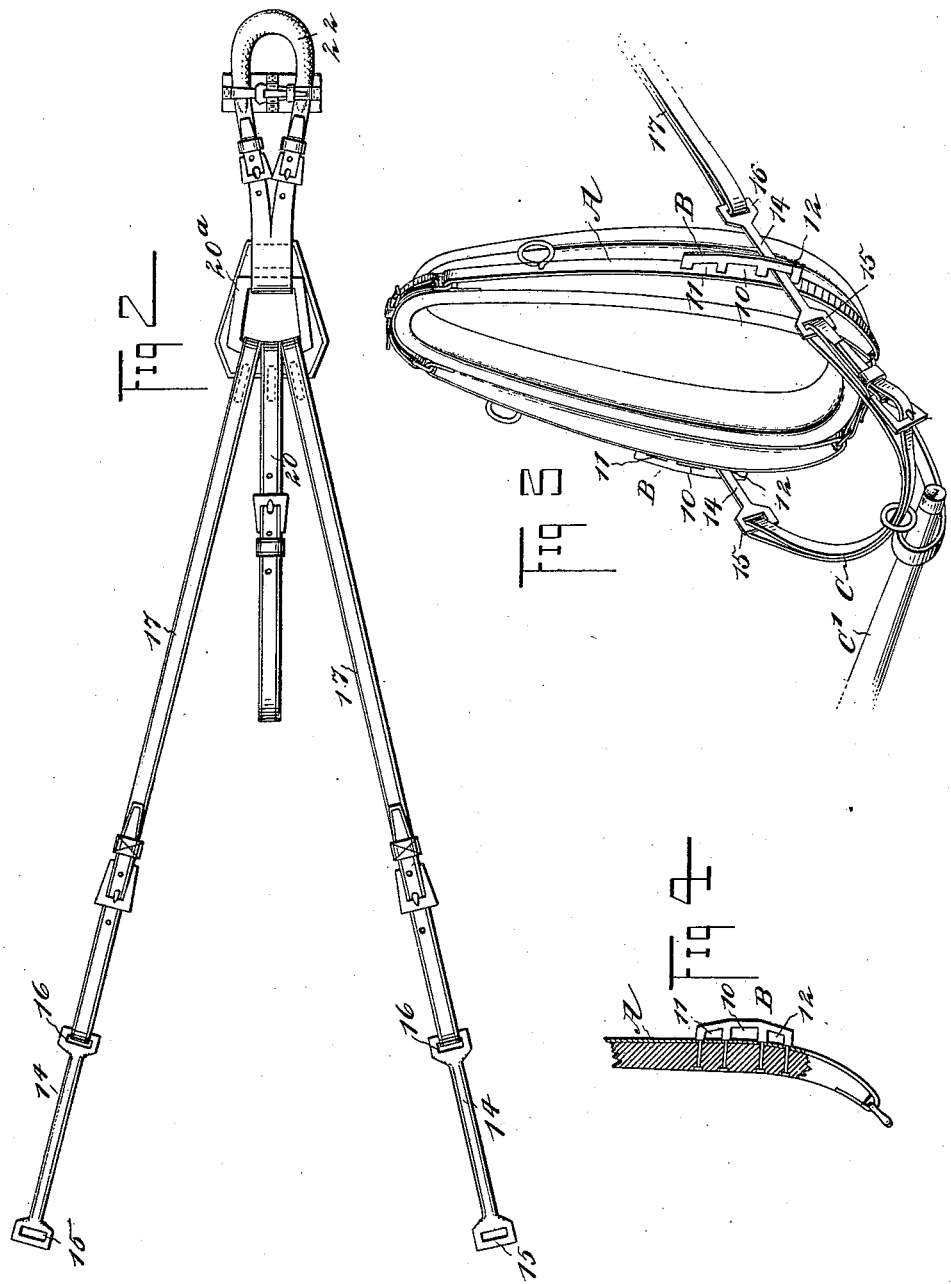

UNITED STATES PATENT OFFICE.

CARL BERNHARDT OLSEN, OF CANBY, MINNESOTA.

HARNESS.

SPECIFICATION forming part of Letters Patent No. 645,327, dated March 13, 1900.

Application filed September 16, 1899. Serial No. 730,712. (No model.)

*To all whom it may concern:*

Be it known that I, CARL BERNHARDT OLSEN, of Canby, in the county of Yellow Medicine and State of Minnesota, have invented a new and Improved Harness, of which the following is a full, clear, and exact description.

The object of the invention is to provide an attachment for all kinds of harness, especially double harness, which will greatly reduce the pressure of the collar upon the neck of a horse and whereby the collar will not move backward and forward when the horse is backing, but will remain in its proper position during such operation, thus preventing in a great measure, if not entirely obviating, sore necks, especially since the weight of the vehicle or its pole or tongue will not be sustained by the collar.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved harness. Fig. 2 is a plan view of the back-strap, breeching, and guide-straps. Fig. 3 is a perspective view of the collar and a portion of the neck-yoke, also a perspective view of a portion of the guide-straps, breast-strap, and neck-yoke; and Fig. 4 is a side elevation, partly in section, of a portion of a hame.

Each section of the hames A is provided with a guide device B in the form of a staple, and this staple is divided into three sections—namely, a central section 10, an upper section 11, and a lower section 12, as shown particularly in Fig. 4, the staples being attached to the hames by bolts or like devices. The traces 13 are attached to the staples B at the central sections 10, and sliding bars 14 are passed through either the upper or the lower sections of the staples B at the option of the driver. Each bar 14 is provided at its forward end with a loop or eye 15 and at its rear end with a second loop or eye 16. The outer loop or eye 15 of each sliding bar is connected with an end of a breast-strap C, which is of the usual construction, as shown in Figs. 1 and 3, and the breast-strap has sliding connection with a neck-yoke C', which may be of the ordinary type. The inner eyes or loops 16 of the sliding bars are connected with guide-straps 17, which guide-straps extend through guide-loops 18, located on the saddle 19, and the said guide-straps are carried to the back-strap 20, which is of the ordinary type. Said guide-straps 17 are connected with the back-strap by means of a ring 20ª, sewing, rivets, or equivalent means, preferably at the point where the hip-strap 21 connects with the back-strap, as shown in Fig. 1.

The back-strap 20 is provided with the usual crupper 22, and the usual breeching 23 is employed. The saddle is provided with a belly-band 24, connected by a martingale 25 with the neck-yoke C', and preferably the martingale is provided with a loop through which the neck-yoke passes. The said martingale is usually permanently connected with the neck-yoke. Two lower breeching or belly straps 26 are connected with the martingale 25 at a point near the center of the belly-band 24, as shown in Fig. 1. Thus the lower breeching or belly straps extend rearward and connect with the ends of the breeching 23, while the upper breeching or holdback strap 27 is located at each side of the harness, connected at one end with a rear loop 16 of a sliding bar 14, and the other or rear end of each holdback-strap is attached to one of the lower breeching-straps 26, and where the upper and lower breeching-straps 26 and 27 connect they are attached to the breeching 23 by a ring 28 or equivalent means. It will be observed that the lower breeching or belly straps 26 serve to hold the breeching 23 in place, and, furthermore, in holding back they draw downwardly upon the neck-yoke through the medium of the martingale 25. It will also be observed that the upper breeching or holdback straps 27 connect with the neck-yoke through the medium of the sliding bars 14 and breast-strap C.

In the operation of the device it will be noticed that the sliding bars 14 move freely in the sections or compartments of the staples B of the hames and that when the horses back the pole may rise at the front; but this will not affect the collars, which will rest in their normal position upon the necks of the animals, and will therefore not bruise or chafe the animals in harness, which injury frequently happens when the ordinary harness is used and the animals are required to hold back. Furthermore, it is obvious that when the horses hold back the weight of the pole is not sustained by the collars, but is almost entirely borne by the breast-straps.

Having thus described my invention, I claim as new and desire to secure by Letters Patent—

1. In a harness, hames, guide devices carried by the hames, traces, means for attaching the traces to the guide devices, a breast-strap, a back-strap, guide-straps attached to the back-strap and led to the front at each side of the animal, and sliding bars passed through the guide devices and connected with the guide-straps and the breast-strap.

2. In a harness, a back-strap, guide-straps attached to the back-strap at a point near the crupper, each guide-strap being provided with a bar capable of sliding upon the hames of the harness and adapted for attachment to the breast-strap of a harness.

3. In a harness, the combination, with hames having staples provided with three sections, the central section being adapted to receive traces, a breast-strap and a back-strap, of guide-straps secured to the back-strap and extending forwardly from their point of attachment, each guide-strap being provided with a bar at its forward end, which bars are arranged to slide through either the upper or the lower sections of the said hame-staples, their forward ends being adapted for attachment to the breast-strap of the harness.

4. In a harness, the combination, with a saddle, the hames, staples secured to the hames, having several sections formed therein, traces attached to the intermediate section of the said staples, guide-loops carried by the saddle, a neck-yoke, a breast-strap connected with the neck-yoke, a martingale, and under and upper breeching-straps connected with each other and with the breeching, the lower breeching-straps being connected with the martingale, of a back-strap, guide-straps attached to the back-strap and passed through the guide-loops of the saddle, sliding bars attached to the guide-straps, which bars pass through the sections in the said hame-staples and are connected with the breast-strap, the upper breeching-straps being connected with the rear end portions of the said sliding bars, as described.

In testimony whereof I have signed my name to this specification in the presence of two subscribing witnesses.

CARL BERNHARDT OLSEN.

Witnesses:
L. M. LENVICK,
SAMUEL LEERSON.